Nov. 3, 1953　　　　　C. S. KASPER　　　　2,657,404
APPARATUS FOR FEEDING A PLURALITY OF SELECTIVELY
　　　　ORIENTED ELONGATED ARTICLES
Filed Aug. 24, 1949　　　　　　　　　3 Sheets-Sheet 1
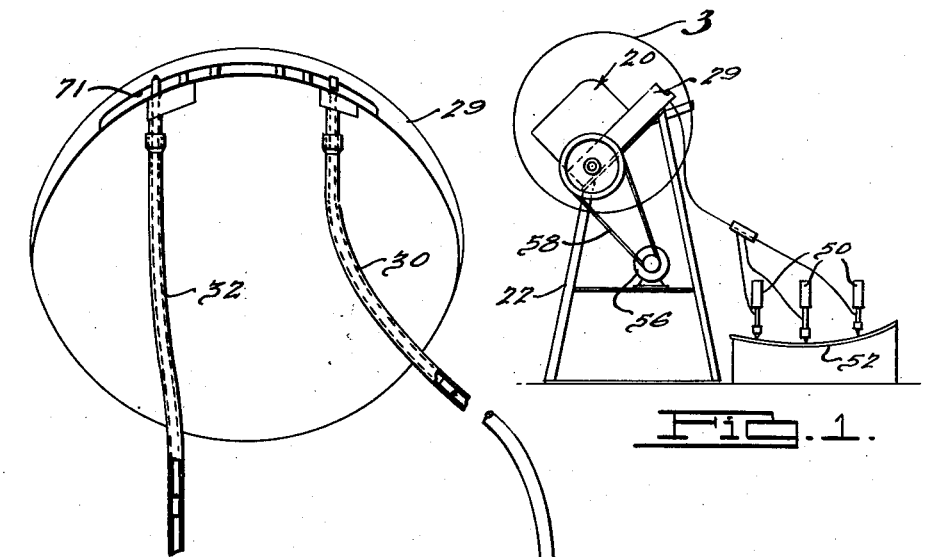
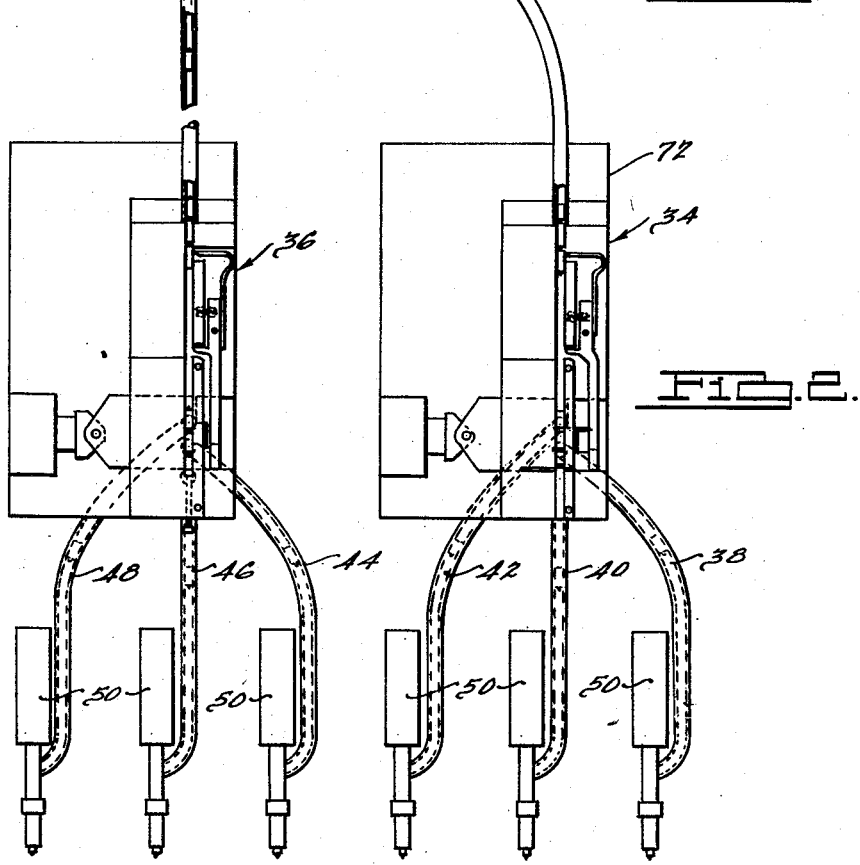
INVENTOR.
*Cass S. Kasper.*
BY
*Harness, Dickey & Pierce*
　　　　ATTORNEYS.

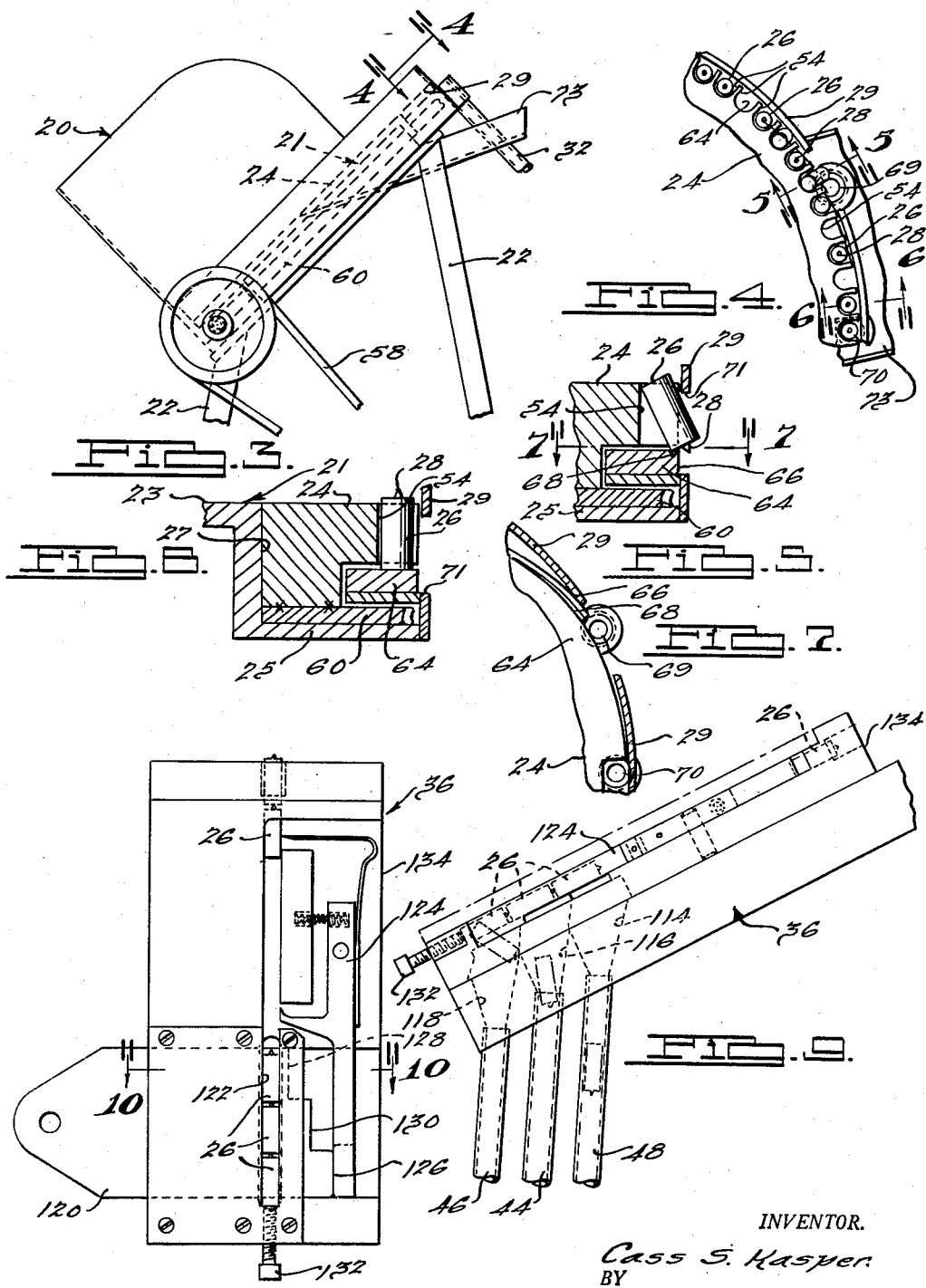

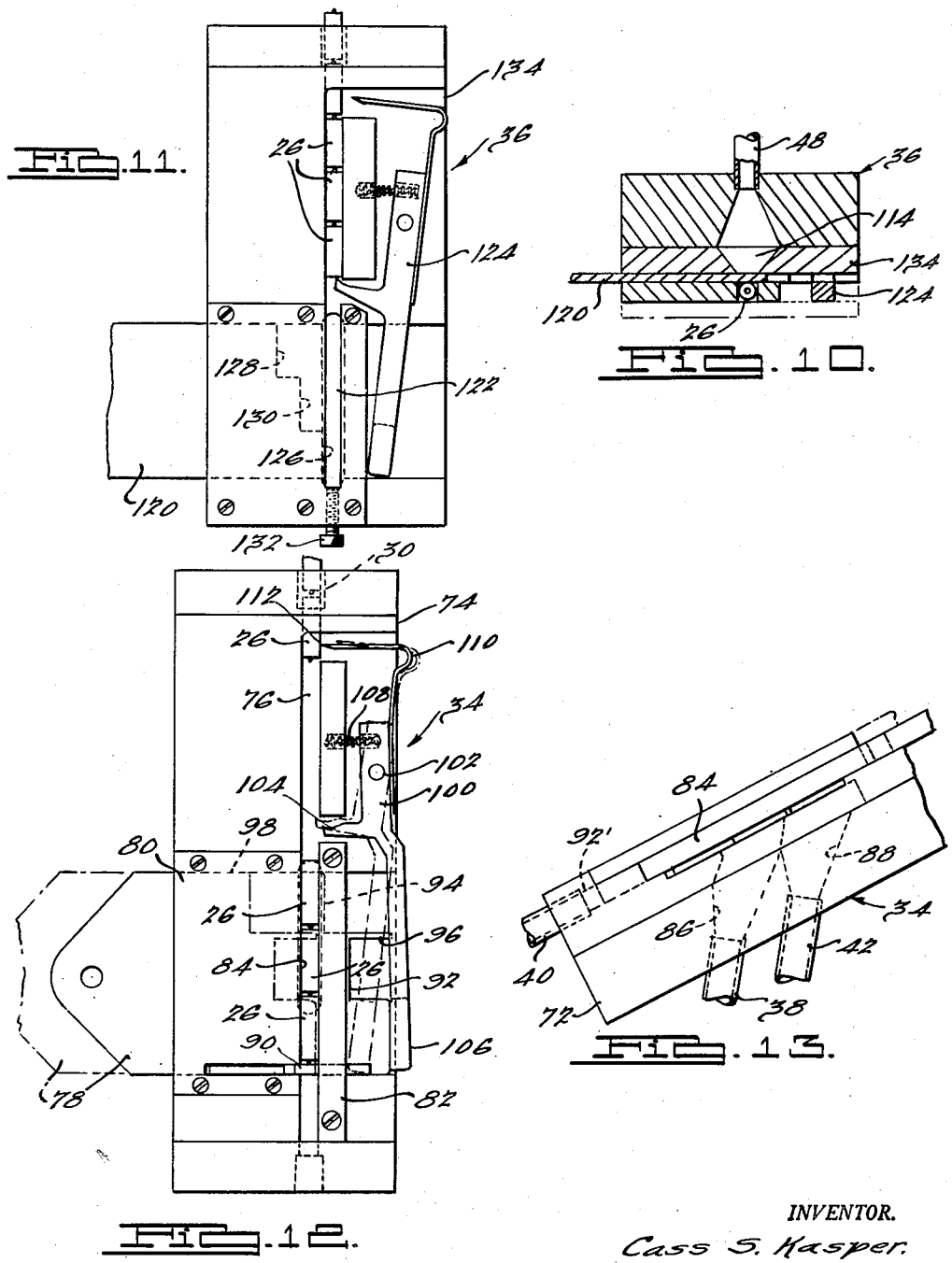

Patented Nov. 3, 1953

2,657,404

UNITED STATES PATENT OFFICE 2,657,404

APPARATUS FOR FEEDING A PLURALITY OF SELECTIVELY ORIENTED ELONGATED ARTICLES

Cass S. Kasper, Grosse Pointe, Mich.

Application August 24, 1949, Serial No. 112,025

11 Claims. (Cl. 10—162)

1

The present invention relates to an improved automatic part feeding machine and contemplates the provision of an improved part distributing mechanism for a machine of the above mentioned type.

In previously known machines of this general type, a hopper has been employed in which are dumped a large number of parts which are to be fed by the machine to a position at which they are to be used. In the hoppers of such previously known machines are mounted means for collecting parts from the hopper which collect the parts without reference to their position, with the result that some of the parts are in the desired position and the remainder of the parts are turned end for end. In these previously known machines, the parts disposed in the proper position with the desired end uppermost are selected and the remaining parts are returned to the hopper.

It is an object of the present invention to provide an improved machine of the above mentioned type for feeding parts having dissimilar ends in which all of the parts collected from the hopper by the means mounted therein are delivered to stations at which they are to be used and disposed in the desired position with the proper end uppermost.

A further object of the invention is to provide a distributing mechanism adapted to receive parts through a supply conduit and distribute the parts to a plurality of discharge conduits with the parts in the discharge conduits disposed in the same end for end relationship as the parts in the supply conduit.

It is also an object of the present invention to provide a distributing mechanism adapted to receive parts from a supply conduit and distribute them to a plurality of discharge conduits with the parts in the discharge conduits disposed in the opposite end for end relationship from that of the parts in the supply conduit.

Another object of the invention is to provide a part feeding machine of the above mentioned type having a feeding capacity substantially greater than that of previously known machines of this type and adapted to supply parts to a plurality of stations at which they are to be used.

Other and more detailed objects of the invention will become apparent from a consideration of the accompanying drawings, the following specification, and the appended claims.

In the drawings:

Figure 1 is a diagrammatic view illustrating an application of a part feeding machine embodying the present invention;

2

Fig. 2 is an enlarged and also somewhat diagrammatic view of the part feeding machine illustrated in Figure 1;

Fig. 3 is a broken enlarged view of that portion of the construction illustrated in Figure 1 indicated by the circle 3;

Fig. 4 is a broken enlarged elevational view of the construction illustrated in Fig. 3, taken from the line 4—4 thereof;

Figs. 5 and 6 are broken enlarged sectional views of the construction illustrated in Fig. 4, taken along the lines 5—5 and 6—6 thereof respectively;

Fig. 7 is a broken sectional view of the construction illustrated in Fig. 5 taken along the line 7—7 thereof;

Fig. 8 is an enlarged elevational view of the left hand one of the two distributing mechanisms illustrated in Fig. 2;

Fig. 9 is a side elevational view of the distributing mechanism illustrated in Fig. 8 and showing the distributing mechanism disposed in the inclined position in which it is used;

Fig. 10 is a sectional view of the construction illustrated in Fig. 8, taken along the line 10—10 thereof;

Fig. 11 is an elevational view of the construction illustrated in Fig. 8 showing another relative position of the part during the operation of the distributing mechanism;

Fig. 12 is an enlarged elevational view of the right hand one of the two distributing mechanisms illustrated in Fig. 2; and, Fig. 13 is a broken side elevational view of the construction illustrated in Fig. 12.

It will be appreciated from a complete understanding of the present invention that the improvements thereof may be readily embodied in machines for feeding parts of widely differing shapes and sizes. In an illustrative, but not in a limiting sense, the improvements of the present invention are herein illustrated and described as embodied in a machine for feeding studs having a small point or projection disposed centrally of one end thereof.

Referring to the drawings, the machine generally comprises a hopper 20 supported on a suitable frame 22 and in which is mounted a rotary plate 24 adapted to collect parts from the hopper 20 and deliver them to hereinafter described selecting means by which the studs 26, which have the above mentioned points, 28, on their lower ends are fed into a tube 30, and the studs having the points 28 on their upper ends are fed into a tube 32. The tubes 30 and 32 deliver the studs 26 to the distributing mechanisms generally indicated at 34 and 36 respectively, from which the studs are distributed to discharge tubes 38, 40, 42, 44, 46 and 48, through which they travel to welding machinery diagrammatically illustrated at 50, at which they may be welded to a suitable workpiece such as the panel 52 illustrated in Fig. 1.

Considering certain of the above generally mentioned elements in greater detail, the hopper 20 is adapted to receive a large quantity of the studs 26 and comprises an inclined bottom plate 21 including a central portion 23, an annular downwardly offset outer marginal portion 25 and an intermediate connecting cylindrical portion 27, and a cylindrical wall 29 extending upwardly at right angles to the bottom plate 21 and having its lower arcuate portion greatly extended for retaining a large number of parts. The cylindrical portion 27 and the outer portion 25 rotatably support the plate 24 which is annular in shape, as best illustrated in Figs. 3 and 6. Around its outer periphery the plate 24 has a plurality of circumferentially spaced notches 54 of a depth slightly greater than the diameter of the studs 26. The plate 24 is rotated about its axis by a motor 56 through a belt drive 58 and a worm wheel 60 welded or otherwise suitably secured to the bottom of plate 24. During the rotation of the plate 24, studs 26 are collected in the notches 54 at the lower side of the plate 24 and are carried upwardly toward the upper portion of the hopper plate 21 indicated at the line 4—4 in Fig. 3 and illustrated in Fig. 4. During this upward movement of the studs 26, they are held against falling radially outwardly and from the notches 54 by wall 29, the internal diameter of which is only slightly greater than the external diameter of the plate 24. The studs 26 are supported during this movement from falling downwardly from the notches 54 by an annular plate 64 extending parallel to and disposed at the under side of plate 24. At its upper side the plate 64 is formed so that its outer edge defines a cam surface 66 which engages the downwardly extending points 28 on the studs 26 and progressively moves the lower ends of the studs 26 outwardly as illustrated in Figures 4 and 5. As this movement continues, the lower edge of the stud 26 moves into a groove 68 formed in the upper surface of the plate 64, which is shaped to continue the progressively outward movement of the lower end of the stud 26. When the stud has been tipped approximately to the position illustrated in Fig. 5, the plate 64 is relieved to permit the stud 26 to fall past the edge of the plate 64 and into a funnel shaped passage 69 which is formed at the upper side of the marginal portion 25 of the plate 21, and to which the tube 30 is connected. At this point, the shape of the plate 64 is such that it will continue to support the studs 26 which are disposed with their points 28 uppermost and these studs will move past the passage 69 to a second similarly shaped passage 70 at which the plate 64 is relieved to permit these studs to fall past the plate 64 and into the passage 70 to which the tube 32 is connected. The lower portion of the hopper wall 29 is cut away, as indicated at 71, to prevent interference of the wall 29 with the feeding of the studs into the tubes 30 and 32. Also, to catch any studs not falling into the passages 69 and 70, an inclined tray 73 is mounted on the underside of the plate 21 and discharges into the hopper 20 through a suitable opening (not shown) in the center portion 23 of the hopper plate 21. By the above described means, it will be appreciated that those of the studs 26 collected by the plate 24, which are disposed with the points 28 down, will be selected by the action of cam 66 and the groove 68 and fed into the passage 69 and the tube 30 disposed with their points 28, down, and those of the studs 26 which have their points 28 up will be carried past the passage 69 and fed into the passage 70 and the tube 32 in which they will be disposed with their points 28 up.

Since it is desired to have the studs disposed with their points projecting downwardly when they arrive at the welding equipment 50, at which they are used, the distributing mechanism 34 to which the studs are delivered by the tube 30 is designed to distribute the studs to the tubes 38, 40 and 42, while maintaining their same end for end relationship and the distributing mechanism 36 distributes the studs from the tube 32 to the discharge tubes 44, 46 and 48 after turning them end for end.

In the broader aspects of the present invention, the distributing mechanism may be employed to distribute the parts to any desired number of discharge tubes. In the preferred embodiment illustrated, the distributing mechanisms 34 and 36 each have three discharge passages. Referring particularly to Figs. 2, 12, and 13, the distributing mechanism 34 is mounted in a block 72 which is mounted on a suitable support (not shown) and is disposed in the inclined position illustrated in Fig. 13. The discharge tubes 38 and 42 are connected to the underside of the block 72 as there illustrated. The distributing mechanism 34 comprises a generally rectangular body 74, the upper end of which is connected to the lower end of the tube 30 and the lower end of which is connected to the discharge tube 40. The upper surface of the body 74 is formed to define a supply passage 76 in its upper portion which communicates with the tube 30 and into which studs 26 are delivered therefrom. A discharge control plate 78 is mounted in the lower portion of the body 74 for movement laterally thereto between the positions illustrated in full and broken lines in Fig. 12. When the discharge control plate 78 is in the position there illustrated in full lines, it cooperates with a generally rectangular plate 80 and a bar 82 secured to the upper surface of the body 74 to define an elongated discharge chamber 84 forming an extension of and communicating with the supply passage 76. Also, when the discharge control plate 78 is in the full line position illustrated in Fig. 12, its upper portions cover discharge passages 86 and 88, formed in the body 74 and which communicate with the discharge tubes 38 and 42 and an upwardly extending flange 90 formed along the lower edge of the control plate 78 blocks a discharge passage 92' which communicates with the discharge tube 40. The plate 78 is formed with its right hand or inner edge as viewed in Fig. 12, shaped in the irregular form there illustrated to automatically provide for the successive uncovering of the discharge passages, 88, 86 and 92' upon movement of the control plate 78 to the left to the position there illustrated in broken lines, thereby insuring that the studs 26 within the discharge chamber 84 will be successively discharged into the tubes 42, 38 and 40, the upper stud being discharged first into the tube 42, after which the middle stud is discharged into the tube 38 and finally the lower stud is discharged into the tube 40.

This successive discharging of the studs is important because the lower studs keep the studs above them from moving beyond the position from which they should be discharged. Also, it will be noted that the control plate 78 is so shaped and proportioned relative to the studs 26 that upon movement of the plate 78 to the left hand or discharge position, the support is removed from the lower portion of each stud successively, while the upper end of the stud continues to be supported, thereby insuring that the studs 26 fall into the discharge tubes 42 and 38 with their pointed ends downward. To insure this result, a generally rectangular notch 92 is provided in the right hand end portion of the plate 78. This notch 92 is spaced from the upper face of the flange 90 a distance slightly less than the length of a stud 26 and the notch itself extends along the plate 78 in the direction of the discharge chamber 84 a distance substantially less than the length of a stud 26. By virtue of this construction, when the plate 78 is moved to the left hand or discharge position, the lower end of the middle stud 26 overlies the notch 92 and its upper end is supported on the plate 78 above the notch 92. Also, the upper right hand portion of the plate 78 is cut away to form a notch 94 of substantially greater depth than the notch 92. Between the notches 92 and 94 the plate 78 has a finger portion 96 which performs the just mentioned function of supporting the upper end of the middle stud when the plate 78 is in the discharge position. The width of the plate 78, from the upper face of the flange 90 to its upper edge 98 is slightly less than the combined length of the three studs 26, so that the upper end of the upper stud is supported on the body 74 above the plate 78 when the plate is moved to its discharge position and the remainder of this upper stud overlies the notch 94. Also, the flange 90 is so proportioned that it is moved out of the path of the lower stud and uncovers the passage 92′ after the plate 78 has been moved to a position in which the middle stud overlies the notch 92.

To provide for the supplying of only three studs into the discharge chamber 84 and prevent other studs from sliding from the tube 30 into the supply passage 76 and into the discharge chamber before the plate 78 has been returned to the closed or right hand position illustrated in full lines in Fig. 12, a measuring arm 100 is pivotally mounted on the body 74 above the plate 78 and to the right of the supply passage 76, as viewed in Fig. 12, by a pivot pin 102. The arm 100 has a finger 104 disposed below the pivot pin 102 and adapted to extend into the supply passage 76 at its lower end. The arm 100 is actuated by the movement of the plate 78 through a lower end portion 106 which is held in engagement with the right hand edge of the plate 78 below the notch 92 by a small compression spring 108 disposed above the pivot pin 102 and acting against the arm 100 and a portion of the body 74. The arm 100 also carries a spring steel finger 110 extending upwardly therefrom and having a sharp inwardly turned end portion 112 adapted to engage the side of a stud 26 to prevent movement of it and the studs above it into the supply passage.

The plate 78 and the arm 100 actuated thereby may be moved by any suitable handle or lever means not shown. It will now be appreciated that the operation of the distributing mechanism 34 is as follows.

When the plate 78 is moved from the closed position illustrated in Fig. 12 to the discharge position there illustrated in broken lines, the arm 100 is moved from the full line position, in which the finger 104 is retracted from the supply passage 76, to the broken line position in which it stops the movement of the studs 26 through the supply passage 76. When the plate 78 is returned to the closed or full line position, the end 112 of the spring finger 110 engages the fourth stud above the finger 104 before the finger 104 is withdrawn from the supply passage with the result that only the three studs in the supply passage 76 above the finger 104 are dropped into the discharge chamber 84. As the plate 78 is moved toward the broken line position, the upper stud in the discharge chamber 84 is first discharged into the tube 42, the middle stud is next discharged into the tube 38 and finally the bottom stud is discharged into the tube 40. Also, during this movement the finger 104 is moved into the lower end of the supply passage 76 before the end 112 of the finger 110 is disengaged from the stud which it is holding, with the result that three studs are again dropped into the supply passage 76.

The distributing mechanism 36 is generally the same as the distributing mechanism 34 but differs therefrom in that its three discharge passages 114, 116 and 118 all open through its bottom surface and in that the plate 120, corresponding to the discharge plate 78, has a stepped inner or right hand end, as viewed in Fig. 8, with no finger portion corresponding to the finger 96. In this distributing mechanism, the studs 26 are received from the tube 32 with the pointed ends uppermost and accordingly, when received in the discharge chamber 122 by the action of the arm 124, are also disposed with their pointed ends uppermost. The shape of the right hand end of the plate 120 is again such that the upper stud is discharged first, the middle stud second, and the lower stud last.

As pointed out above, in distributing the studs in the mechanism 36, it is necessary to turn them end for end so that the studs in the discharge tubes 48, 44 and 46 will have their pointed ends down. To effect this turning end for end, the plate 120 is shaped so that the support is successively removed from the upper pointed end of each of the studs 26 while continuing to support its lower end. To form the stepped inner or right hand edge on the plate 120, as viewed in Fig. 8, its lower portion 126 extends to the right appreciably beyond its upper portion 128 and the intermediate portion 130 extends to a point intermediate the upper and lower portions 128 and 126. A screw 132 is mounted in the lower end of the body 134 in alignment with the discharge chamber 122 and its inner end provides an abutment for the button stud in the discharge chamber. The screw 132 is disposed to permit the lower end of the bottom stud to pass beyond the plate 120 and overlie a part of the body 134. The distance between the inner end of the screw 132 and the upper edge of the plate 120 is slightly greater than the combined length of three studs 26. The distance from the inner end of the screw 132 to the upper edge of the intermediate portion 130, measured along the discharge chamber 122, is slightly more than the combined length of two studs. And the distance, similarly measured from the inner screw end to the upper edge of the portion 126 of the plate 120, is slightly greater than the length of one stud 26. By virtue of the above described construction, when the plate 120 is moved to the left from the position illustrated in Fig. 8, the uppermost stud 26 in the chamber 122 is first discharged into the tube 48 point down, next the middle stud is discharged into the tube 44 point down, and finally the bottom stud is discharged into the tube 46 point down.

It will now be appreciated that the inclination of the distributing mechanisms 34 and 36 is such that the parts will slide by the force of gravity into the supply passage and from the latter into the discharge chamber, and will then fall from the discharge chamber into the discharge tubes upon movement of the discharge control plate.

While only one specific embodiment of the invention has been illustrated and described in detail, it will be apparent to those skilled in the art that numerous changes and modifications may be made without departing from the spirit of the invention.

What is claimed is:

1. A distributing mechanism adapted to receive a plurality of parts from a supply conduit and distribute them to a plurality of discharge conduits, said mechanism comprising body means defining a supply passage adapted to communicate with said supply conduit and a plurality of discharge passages adapted to communicate with said discharge conduits, a discharge control member mounted in said body means and cooperating therewith to define an inclined discharge chamber and adapted to receive a number of the parts corresponding to the number of the discharge passages and with the parts arranged one above the other, said discharge control member being movable between a first position in which it closes said discharge passages and in which it is adapted to support a said number of said parts in said discharge chamber, and a second position in which said discharge passages communicate with said discharge chamber, means for admitting a said number of said parts into said chamber, means for moving said control member between said positions, and means, including means on said discharge control member, effective upon movement of said member from said first position to said second position, to successively admit one of said number of the parts from said discharge chamber into each of said discharge passages beginning with the uppermost of said number of parts first.

2. A distributing mechanism adapted to receive a plurality of parts from a supply conduit and distribute them to a plurality of discharge conduits, said mechanism comprising body means defining a supply passage adapted to communicate with said supply conduit and a plurality of discharge passages adapted to communicate with said discharge conduits, a discharge control member mounted in said body means and cooperating therewith to define an inclined discharge chamber adapted to receive a number of the parts corresponding to the number of the discharge passages and with the parts arranged one above the other, said discharge control member being movable between a first position in which it closes said discharge passages and in which it is adapted to support a said number of said parts in said discharge chamber, and a second position in which said discharge passages communicate with said discharge chamber, means for admitting a said number of said parts into said chamber, means for moving said control member between said positions, means actuated in response to movement of said control member to admit a said number of said parts into said chamber, and means, including means on said discharge control member, effective upon movement of said member from said first position to said second position, to successively admit one of said number of the parts from said discharge chamber into each of said discharge passages beginning with the uppermost of said number of parts first.

3. A distributing mechanism adapted to receive a plurality of parts from a supply conduit and distribute them to a plurality of discharge conduits, said mechanism comprising body means defining a supply passage adapted to communicate with said supply conduit and a plurality of discharge passages adapted to communicate with said discharge conduits, a discharge control member mounted in said body means and cooperating therewith to define an inclined discharge chamber adapted to receive a number of the parts corresponding to the number of the discharge passages and with the parts arranged one above the other, said discharge control member being movable between a first position in which it closes said discharge passages and in which it is adapted to support a said number of said parts in said discharge chamber, and a second position in which said discharge passages communicate with said discharge chamber, means for admitting a said number of said parts into said chamber, means for moving said control member between said positions, means supporting said body means in inclined relation to a horizontal plane so that said number of parts may slide by the action of the force of gravity from said supply passage into said chamber and fall by the force of gravity from said chamber into said discharge passages, and means, including means on said discharge control member, effective upon movement of said member from said first position to said second position, to successively admit one of said number of the parts from said discharge chamber into each of said discharge passages beginning with the uppermost of said number of parts first.

4. A distributing mechanism adapted to receive a plurality of parts from a supply conduit and distribute them to a plurality of discharge conduits, said mechanism comprising body means defining a supply passage adapted to communicate with said supply conduit and a plurality of discharge passages adapted to communicate with said discharge conduits, a discharge control member mounted in said body means and cooperating therewith to define an inclined discharge chamber adapted to receive a number of the parts corresponding to the number of the discharge passages and with the parts arranged one above the other, said discharge control member being movable between a first position in which it closes said discharge passages and in which it is adapted to support a said number of said parts in said discharge chamber, and a second position in which said discharge passages communicate with said discharge chamber, means for admitting a said number of said parts into said chamber, means for moving said control member between said positions, and means on said discharge control member and said body means effective when said member is moved from said first position to said second position to successively temporarily support each of the parts in said discharge chamber at one end only so that beginning with the uppermost of said number of parts each of said number of parts falls from said discharge chamber with said one end thereof uppermost.

5. A distributing mechanism adapted to receive a plurality of parts from a supply conduit and distribute them to a plurality of discharge conduits, said mechanism comprising body means defining a supply passage adapted to communicate with said supply conduit and a plurality of discharge passages adapted to communicate with said discharge conduits, a discharge control member mounted in said body means and cooperating therewith to define an inclined discharge chamber adapted to receive a number of the parts corresponding to the number of the discharge passages and with the parts arranged one above the other, said discharge control member being movable between a first position in which it closes said discharge passages and in which it is adapted to support a said number of said parts in said discharge chamber, and a second position in which said discharge passages communicate with said discharge chamber, means for admitting a said number of said parts into said chamber, means for moving said control member between said positions, and means on said discharge control member and said body means effective when said member is moved from said first position to said second position to successively temporarily support each of the parts in said discharge chamber at one end only so that beginning with the uppermost of said number of parts each of said number of parts falls from said chamber in the same end for end relation in which it is received by said distributing mechanism.

6. A distributing mechanism adapted to receive a plurality of parts from a supply conduit and distribute them to a plurality of discharge conduits, said mechanism comprising body means defining a supply passage adapted to communicate with said supply conduit and a plurality of discharge passages adapted to communicate with said discharge conduits, a discharge control member mounted in said body means and cooperating therewith to define an inclined discharge chamber adapted to receive a number of the parts corresponding to the number of the discharge passages and with the parts arranged one above the other, said discharge control member being movable between a first position in which it closes said discharge passages and in which it is adapted to support a said number of said parts in said discharge chamber, and a second position in which said discharge passages communicate with said discharge chamber, means for admitting a said number of said parts into said chamber, means for moving said control member between said positions, and means on said discharge control member and said body means effective when said member is moved from said first position to said second position to successively temporarily support each of the parts in said discharge chamber at one end only so that beginning with the uppermost of said number of parts each of said number of parts falls from said chamber in inverted end for end relation relative to that in which said parts are received by said distributing mechanism.

7. A distributing mechanism adapted to receive a plurality of parts from a supply conduit and distribute them to a plurality of discharge conduits, said mechanism comprising body means defining a supply passage adapted to communicate with said supply conduit and a plurality of discharge passages adapted to communicate with said discharge conduits, a discharge control member mounted in said body means and cooperating therewith to define a discharge chamber adapted to receive a number of the parts corresponding to the number of the discharge passages, said discharge control member being movable between a first position in which it closes said discharge passages and in which it is adapted to support a said number of said parts in said discharge chamber, and a second position in which said discharge passages communicate with said discharge chamber, means for admitting a said number of said parts into said chamber, means for moving said control member between said positions, means supporting said body means in inclined relation to a horizontal plane so that said chamber is disposed in an inclined position and said number of parts may slide by the action of the force of gravity from said supply passage into said chamber and fall by the force of gravity from said chamber into said discharge passages, said chamber being adapted to receive said number of parts arranged one above the other, and means, including means on said discharge control member, effective upon movement of said member from said first position to said second position, to successively admit one of said number of the parts from said discharge chamber into each of said discharge passages beginning with the uppermost of said number of parts first.

8. A distributing mechanism adapted to receive a plurality of parts from a supply conduit and distribute them to a plurality of discharge conduits, said mechanism comprising body means defining a supply passage adapted to communicate with said supply conduit and a plurality of discharge passages adapted to communicate with said discharge conduits, a discharge control member mounted in said body means and cooperating therewith to define an inclined discharge chamber adapted to receive a number of the parts corresponding to the number of the discharge passages and with the parts arranged one above the other, said discharge control member being movable between a first position in which it closes said discharge passages and in which it is adapted to support a said number of said parts in said discharge chamber, and a second position in which said discharge passages communicate with said discharge chamber, means for admitting a said number of said parts into said chamber, and means for moving said control member between said positions, and means, including means on said discharge control member, effective upon movement of said member from said first position to said second position, to successively admit one of said number of the parts from said discharge chamber into each of said discharge passages beginning with the uppermost of said number of parts first, said means for admitting said parts to said chamber comprising an arm pivotally mounted on said body and having a finger adapted to move into said supply passage into the path of parts moving therefrom into said chamber and a spring finger disposed in spaced relation above said finger adapted upon pivotal movement of said arm to move into engagement with one of said parts prior to the withdrawal of said first named finger from said passage so that only those parts disposed below said part engaged by said second finger may pass into said discharge chamber.

9. A distributing mechanism adapted to receive a plurality of parts from a supply conduit and distribute them to a plurality of discharge conduits, said mechanism comprising a body, means for supporting said body in a position inclined relative to a horizontal plane, said body having an opening at its upper end for connection to said supply conduit and a supply passage formed in its upper surface aligned and communicating with said opening, a discharge control plate mounted on said body for movement transversely thereof and cooperating with said body to define a discharge chamber aligned and communicating with said supply passage at its lower end, said body having a discharge passage adapted to be connected to one of said discharge conduits and formed in said body at the underside thereof and communicating with an upper portion of said discharge chamber and another discharge passage in its lower end portion forming an extension of and communicating with said discharge chamber at its lower end, said discharge plate having a flange covering said last named discharge passage in one position of said plate and disposed clear of said passage in another position of said plate, said plate also having an opening spaced above the upper face of said flange a distance slightly more than the length of one of said parts and extending upwardly along said plate to a point slightly less than the combined length of two of said parts above the upper face of said flange, said opening having an extent, measured longitudinally of said plate, overlapping the extent of said flange, similarly measured, so that upon movement of said plate from said another position to said one position the part in the lower end of said chamber will be temporarily held in place after said opening underlies the part immediately above it, and means for admitting a number of parts to said chamber corresponding to the number of discharge passages communicating therewith.

10. A distributing mechanism adapted to receive a plurality of parts from a supply conduit and distribute them to a plurality of discharge conduits, said mechanism comprising a body, means for supporting said body in a position inclined relative to a horizontal plane, said body having an opening at its upper end for connection to said supply conduit and a supply passage formed in its upper surface aligned and communicating with said opening, a discharge control plate mounted on said body for movement transversely thereof and cooperating with said body to define a discharge chamber aligned and communicating with said supply passage at its lower end, said body having a plurality of discharge passages adapted to be connected to certain of said discharge conduits and formed in said body at the underside thereof and communicating with upper portions of said discharge chamber and another discharge passage in its lower end portion forming an extension of and communicating with said discharge chamber at its lower end, said discharge plate having a flange covering said last named discharge passage in one position of said plate and disposed clear of said passage in another position of said plate, said plate also having stepped openings spaced above the upper face of said flange and adapted to progressively register with discharge passages individual thereto during movement of said plate from said one position to said another position, said plate also having finger means intermediate said stepped openings adapted to support the upper end of the one of the parts overlying the lower of the stepped openings, the stepped arrangement of said openings being such that the parts in said chamber are successively discharged from the top to the bottom, and means for admitting to said chamber a number of parts corresponding to the number of said discharge passages communicating with said chamber.

11. A distributing mechanism adapted to receive a plurality of parts from a supply conduit and distribute them to a plurality of discharge conduits, said mechanism comprising a body, means for supporting said body in a position inclined relative to a horizontal plane, said body having an opening at its upper end for connection to said supply conduit and a supply passage formed in its upper surface aligned and communicating with said opening, a discharge control plate mounted on said body for movement transversely thereof and cooperating with said body to define a discharge chamber aligned and communicating with said supply passage at its lower end, said body having a discharge passage adapted to be connected to said discharge conduits and formed in said body at the underside thereof and communicating with said discharge chamber, said discharge chamber extending slightly below the lower edge of said discharge plate so that the lower end of the part in the lower end of said discharge chamber is supported on said body, said plate having a stepped edge including a plurality of offset upwardly facing edge portions adapted to successively support the lower ends of the other parts in said chamber as said plate is moved from a first position in which it covers all of said discharge passages to a second position in which it is clear of all of said discharge passages, so that during said movement of said plate the parts in said chamber are successively discharged into said discharge passages with the ends which were up in said chamber being down in said passage, and means for admitting to said chamber a number of parts corresponding to the number of discharge passages communicating with said chamber.

CASS S. KASPER.

References Cited in the file of this patent

UNITED STATES PATENTS

| Number | Name | Date |
| --- | --- | --- |
| 1,275,581 | Macomber | Aug. 13, 1918 |
| 1,406,963 | Angus | Feb. 21, 1922 |
| 1,463,338 | Schroeder | July 31, 1923 |
| 1,739,422 | Schmidt | Dec. 10, 1929 |
| 1,863,314 | Phelps | June 14, 1932 |
| 1,897,116 | Freedman | Feb. 14, 1933 |
| 2,060,182 | Dellaree | Nov. 10, 1936 |
| 2,264,105 | White | Nov. 25, 1941 |
| 2,327,126 | Raltsch | Aug. 17, 1943 |
| 2,388,405 | Glaude | Nov. 6, 1945 |
| 2,433,096 | Davis | Dec. 23, 1947 |
| 2,543,244 | Klooz et al. | Feb. 27, 1951 |